Figures 1, 2:
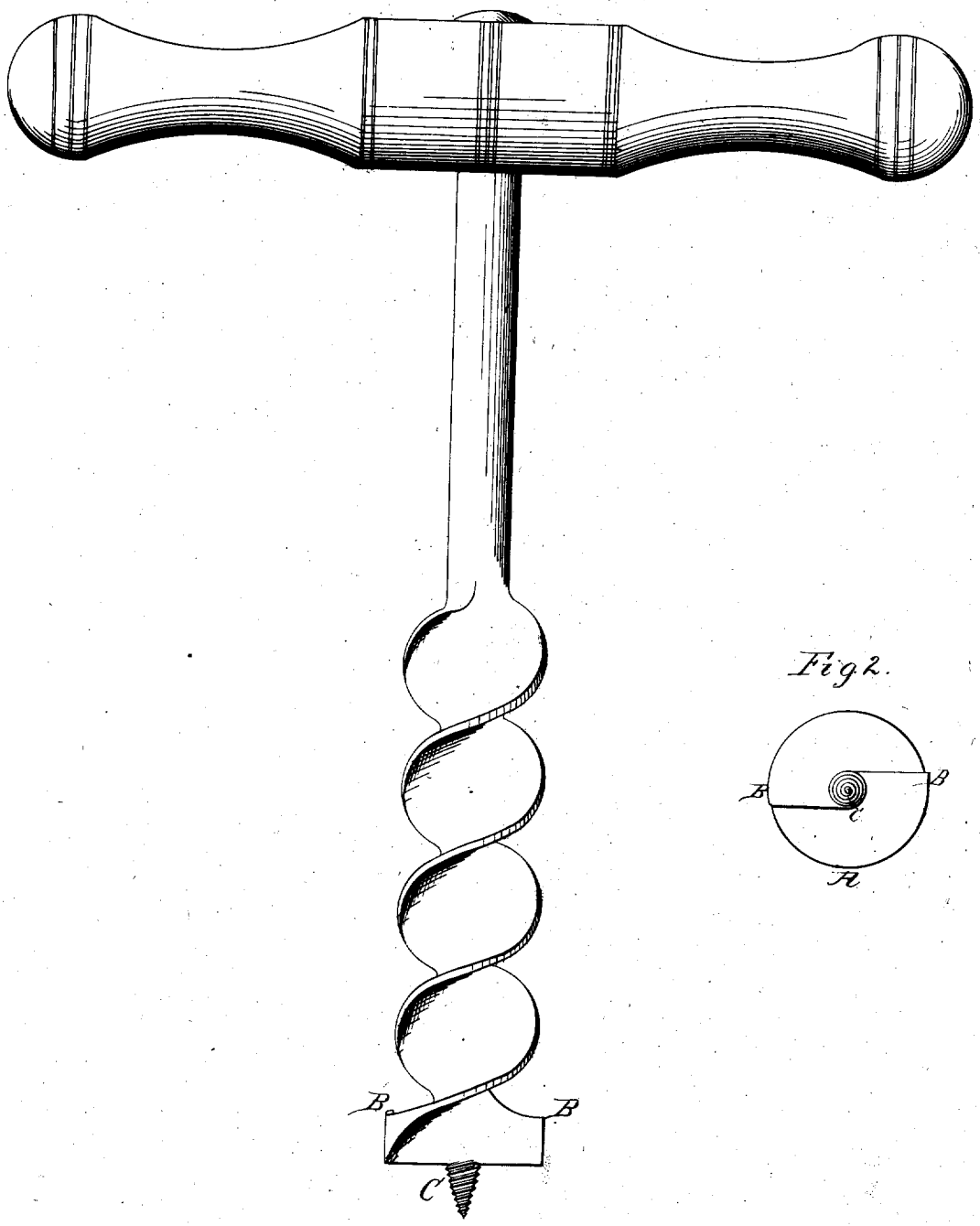

1114X

E. L. Hommedieu,

Wood Auger;

Patented July 31, 1809.

July 31. 1809

Ezra L'Hommedieu 1114X

Letters Patent.

The Schedule referred to in these Letters Patent and making part of
the same containing a description in the words of the said Ezra L'Hommedieu himself of his double podded centre screw auger This auger at the end of which enters the timber has a screw in the centre which supercedes the necessity of a gouge. The auger as its name imports is made with two Pods directly opposite to each other. and at the extremities of each pod next the screw are two sharp lips for cutting the timber. The auger may be made of any dimensions. the shaft and handle like those in common use otherwise at the pleasure of the owner. The great superiority of this auger over every other in use consists in its being more strong and durable, in turning much easier, boring faster and drawing out of the hole with more ease.

Witnesses
Obadiah Platts
Elijah Worthington

Ezra L'Hommedieu

Exd
[illegible]

(161 words)

(Drawing)

[illegible]